United States Patent [19]

Dickerson

[11] 4,176,694

[45] Dec. 4, 1979

[54] AUTOMATIC SHUTOFF LIQUID DISPENSING VALVE

[75] Inventor: Delbert J. Dickerson, Inglewood, Calif.

[73] Assignee: Donald R. Dickerson, Gig Harbor, Wash.

[21] Appl. No.: 890,255

[22] Filed: Mar. 27, 1978

[51] Int. Cl.[2] ........................ B65B 3/26; B65B 57/04; B67D 5/06; G01F 23/00

[52] U.S. Cl. ...................................... 141/95; 116/109; 137/453; 141/198; 141/304; 141/308; 222/185

[58] Field of Search .......... 141/95, 198, 304, 308-310, 141/363, 364, 384, 386; 116/109; 137/453, 454; 251/310, 312; 222/146 C, 185, 484

[56] References Cited

U.S. PATENT DOCUMENTS

| | | | |
|---|---|---|---|
| 539,460 | 5/1895 | Webster | 141/309 X |
| 577,784 | 2/1897 | Proctor | 141/304 |
| 1,622,163 | 3/1927 | Niederhauser | 222/185 |
| 2,565,010 | 8/1951 | Warner | 141/198 X |
| 2,637,336 | 5/1953 | Emery, Jr. | 137/454 |
| 2,908,026 | 10/1959 | Brewer, Jr. | 137/453 |
| 3,540,402 | 11/1970 | Koeher | 137/454 X |
| 3,684,127 | 8/1972 | Kruse, Jr. | 141/95 X |
| 3,913,611 | 10/1975 | St. John | 137/453 |
| 3,973,602 | 8/1976 | Kruse | 141/309 X |

*Primary Examiner*—Stuart S. Levy
*Attorney, Agent, or Firm*—C. Michael Zimmerman

[57] ABSTRACT

A dispensing valve for controlling the flow of a liquid from a container into a receptacle is described. Such valve is designed to terminate liquid flow automatically when the liquid level within the receptacle reaches a predetermined height. It includes a cap to be secured hermetically on the mouth of a liquid container and a stud to project axially from the cap into the interior of such container. At least two passages extend through the stud, one of such passages being a liquid passage for the flow of liquid from the container and the other being an air passage for the flow of air in the container to replace the liquid. A conduit projects outwardly from the cap to have its free end immersed by liquid within the receptacle being filled when the liquid therein reaches the desired height. Such conduit has an air inlet in its free end which communicates with the air passage extending through the stud. When the liquid reaches a predetermined height within the receptacle being filled, the free end of the conduit, and hence the air inlet, becomes immersed by the liquid. The body of the valve is made up of a pair of coaxial, mating bodies which can be rotated relative to one another to close the air and liquid passages extending therethrough for manual termination of liquid flow.

10 Claims, 3 Drawing Figures

AUTOMATIC SHUTOFF LIQUID DISPENSING VALVE

BACKGROUND OF THE INVENTION

This invention relates to a liquid dispensing valve for controlling the flow of a liquid from a container into a receptacle and, more particularly, to such a valve which automatically shuts off flow when the receptacle is full while otherwise providing full liquid flow in an audible manner.

Liquid dispensing valves designed to automatically shut off, i.e., discontinue dispensing the liquid, when a receptacle into which the liquid is being dispensed is full, are already known. Such valves typically have separate air and liquid passages. The purpose of the air passage is to allow air to enter the container to replace liquid which flows therefrom. Structure of the dispensing valve defining the air passage extends into the receptacle interior during flow of liquid from the container. When the liquid within the receptacle reaches a predetermined height (the receptacle is filled), it covers the air passage inlet and, hence, blocks the flow of air into the container. This stops liquid flow ("turns off the valve") since when no inward air flow is allowed to prevent the creation of a vacuum in the container, the liquid cannot flow therefrom. For example, such an arrangement is shown in U.S. Pat. No. 577,784 issued to C. W. and R. E. Proctor.

Prior designs of liquid dispensing valves having such an automatic shutoff arrangement have technical deficiencies which have inhibited significant adoption of the same. For one, most of such arrangements have a relatively restricted liquid flow passage so that when the air flow passage is blocked as described, no substantial air flow can enter the container through the liquid passage. This reduces the rate at which liquid can be dispensed from the container. Also, because of the separate air and liquid passages, there is no "gurgle" or other audible sound to indicate whether or not liquid is flowing from the container, i.e., there is no reverse air flow through the liquid spout which audibly interacts with such liquid. In view of this, it is difficult for a user of such an arrangement to easily tell whether or not liquid is flowing from the container. Thus, the user cannot reliably tell when a receptacle is full so that he can discontinue the filling operation. This deficiency is particularly noticeable if the receiving receptacle has a relatively small mouth, such as found on fuel tanks, not conducive to a visible checking of the liquid depth.

SUMMARY OF THE INVENTION

The present invention is an automatic shutoff liquid dispensing valve which both permits an adequate flow of liquid and indicates audibly whether or not liquid is flowing therefrom. Such valve includes a cap to be secured hermetically on the mouth of the liquid container, a stud portion to project axially from the cap into the interior of the container when the cap is secured on the container mouth, and at least two passages extending through the stud, one of such passages being a liquid passage for the flow of liquid from the container and the other being an air passage for the flow of air into the container to replace the liquid. To provide automatic liquid shut off, a conduit projecting outwardly from the cap has an air inlet at its free end. The air inlet communicates with the air passage which extends through the stud. When the liquid reaches a predetermined height within the receptacle being filled, the free end of the conduit and, hence, the air inlet, becomes immersed by the liquid. Flow of air through the air inlet and air passage is therefore stopped. This terminates flow of air into the container and, hence, shuts off the flow of liquid.

As a particularly salient feature of the instant invention, the liquid and air passages in the stud communicate the interior of the container with a common passageway for both air and liquid extending through the cap. Air and liquid travel in opposite directions through the common passageway when liquid is being dispensed from the container with the result they audibly interact with one another to indicate to a user that liquid flow is underway.

Most desirably, a plurality of liquid passages are provided communicating the interior of the container with the common passageway so that a relatively full volume of liquid can flow through the valve into the receptacle. In this connection, it is preferable that the conduit described above provide an extension of the common passageway so that when its free end is immersed by liquid, flow of air into the common passageway for subsequent flow through either the liquid or air passages into the container, is completely blocked. That is, with such construction flow of air into the container through either the air passage or the liquid passage is prevented so that complete elimination of all flow of liquid from the container is assured.

The invention includes other features and advantages which will be described or will become apparent from the following more detailed description of a preferred embodiment.

BRIEF DESCRIPTION OF THE DRAWING

With reference to the single sheet of drawing.

DETAILED DESCRIPTION OF A PREFERRED EMBODIMENT

Figure 1:
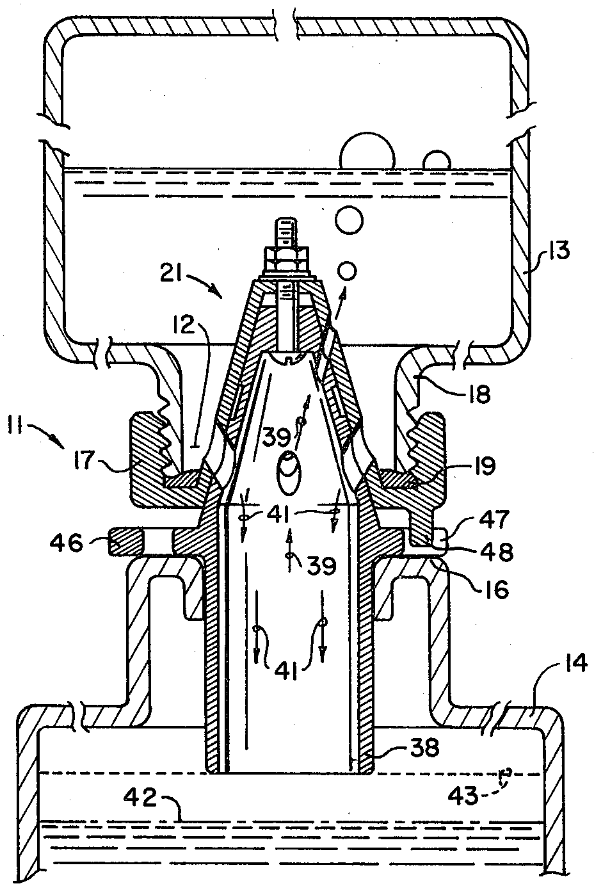
FIG. 1 is a partially broken away and sectional view of a preferred dispensing valve of the invention, illustrating the same secured on the mouth of a liquid container and in position to dispense liquid into a receptacle.
Figure 3:
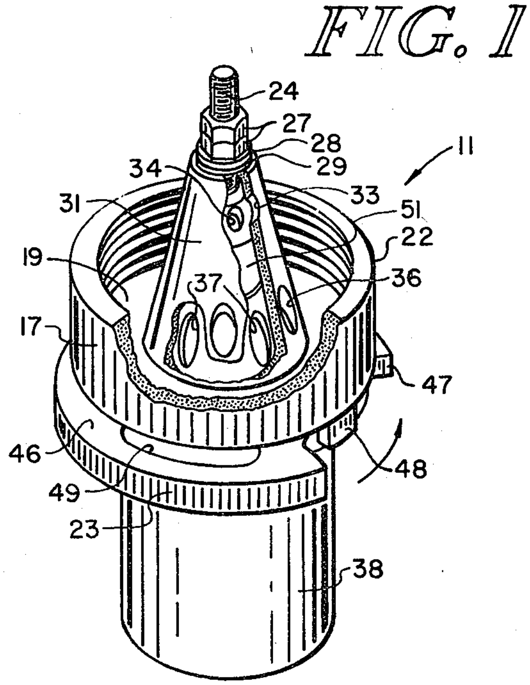
FIG. 3 is an isometric view of the valve of FIG. 1 partly broken away to show details of its construction.

With reference particularly to FIG. 1 of the drawing, a preferred embodiment of the valve of the invention, generally referred to by the reference numeral 11, is shown hermetically secured on the mouth 12 of a container 13, which container and valve are in the process of dispensing liquid into a receptacle 14 through a filler opening 16. Container mouth 12 is provided by a neck 18 having external threads thereon. Cap 17 threadably engages such threads and includes a gasket 19 which assures a hermetic seal between the valve cap and container mouth.

The dispensing valve further includes a stud portion 21 which is positioned in the interior of the container when the cap is secured on the container's mouth. In this connection, the valve is provided by two bodies 22 and 23 (see FIG. 2) which coaxially mate with one another and are secured together for relative rotation by a nut and bolt arrangement. That is, a bolt 24 extends from the body 23 through an aperture 26 in the body 22 designed to accept the same. Two nuts 27 threadably engage the end of bolt 24 to hold the bodies together. A standard bearing washer 28 and a spring washer 29, the purpose of which will be described hereinafter, are positioned on the bolt 24 between the body 22 and the nuts 27.

Stud portion 21 includes both air and liquid passages which extend through it. Such stud portion is actually defined by a pair of mating, hollow conical projections 31 and 32 provided respectively on the bodies 22 and 23. A single air passage extends through the wall of stud 21, which air passage is made up of a pair of ports 33 and 34 projecting respectively through the conical projections 31 and 32 adjacent the upper ends thereof. A plurality of liquid passages are provided near the base of the stud portion. Each of such liquid passages is defined by a pair of ports 36 and 37 extending through the conical projections.

Both the air passage and all of the liquid passages communicate the interior of the container 13 with a common passageway of the valve which extends through the cap 17. That is, as is best illustrated in FIG. 1, such passages extend into the hollow interior of the conical projection 32, which projection extends through the cap 17. A tubular conduit portion 38 is provided integral with the base of the conical projection 32. Such conduit portion defines, in effect, a continuation or extension of the common passageway provided by the hollow conical projection 32, which extension projects outwardly from the cap.

Conduit 38 acts both as a spout for liquid to be dispensed from the container and as an air conduit which communicates with the air passage to provide automatic valve shutoff. That is, any air which is to flow through the air passage of the valve into the container must first pass through such conduit 38. It will travel in the direction indicated by the arrows 39. Liquid which is dispensed from the container will also flow through the conduit 38. However, it will flow through the liquid passages and out through the conduit in the direction indicated by the arrows 41.

It should be readily apparent how the valve construction described to this extent provides automatic shutoff of liquid flow. FIG. 1 illustrates the valve condition when liquid is being dispensed from the container into the receptacle. The liquid level within the receptacle is indicated at 42. When such liquid level reaches the phantom position indicated at 43, the liquid will cover the open end of the conduit, which open end is the inlet for air into such conduit. Thus, no further air will be permitted to flow into the conduit and through the air passage into the container. The result will be that a vacuum will be created within the container upon gravitational force urging further flow of liquid therefrom. This vacuum will prevent further liquid flow and, therefore, result in the automatic shutoff of such flow. The length of conduit 38 is selected to provide such automatic shutoff when the liquid reaches a desired level in the receptacle.

The construction and operation of the valve as so far described provides a combination of advantages not found in prior constructions. One of such advantages results from the fact that air flowing into the container passes through a common passageway with the liquid flowing out of such container. This air-water flow in opposite directions results in an audible interaction of the air and liquid, akin to the "gurgling" typically associated with the flow of liquid from an unvented container. As mentioned previously, such audible interaction informs a user of the valve if and when liquid is flowing therefrom. When flow is discontinued, for example, by the level of liquid within the receptacle immersing the free end of the conduit 38, the audible interaction between the air and liquid flow will stop and indicate to the user that the receptacle is full.

The relative locations of the air and liquid passages extending through the valve conical projections into the interior of the container also adds to the desirability of the valve. That is, the air passage communicates with the common passageway further from the cap than the liquid passages. The result is that when liquid is being dispensed from a container through the valve, no liquid will be present at the air passage entrance to inhibit or otherwise interfere with air flow. The result is that the air passage diameter can be made sufficiently small to prevent the likelihood of reverse flow of liquid through the same, without restricting the amount of air which can flow into the container.

There is another advantage associated with the fact the air inlet into the conduit 38 is common with the liquid outlet. Immersion of the free end of the conduit prevents flow of air through either the air passage of the valve or reversely through its liquid passages. Thus, the valve construction assures that no undesired reverse flow of air through the liquid passages is permitted, without requiring that such liquid passages be restricted in size. The volume of liquid flow therefore can be maximized by providing a plurality of liquid passages having large cross-sectional areas. While this particular advantage associated with applicant's common passageway construction can be provided in other ways, insofar as applicant is aware, there is no other valve having a construction combining this advantage with the other advantages discussed previously.

Dispensing valve 11 is designed to permit manual closing when desired to prevent liquid flow therethrough. Thus, once the liquid flow through the valve is automatically shut off when the receptacle is full, the valve can be manually closed to assure no further liquid will flow from the container even when the valve conduit is lifted from the receptacle and is not immersed by liquid therewithin.

Manual shutoff of the valve is effected by rotating the two bodies making up such valve relative to one another. As mentioned previously, both the air and liquid passages are defined by ports which extend through the conical projections of such bodies. When the ports of one of such bodies are in registration with the associated ports of the other one as illustrated in FIG. 1, the passages are open. However, the bodies are in a different rotated orientation relative to one another, such ports are misaligned and both the air and liquid passages are closed.

Means are provided graspable manually to rotate one of the bodies relative to the other. To this end, an annular flange 46 is formed integral with the body 23 and extends radially outward therefrom adjacent the junction of the conduit 38 with the conical projection 32. The periphery of such flange is knurled to facilitate manual grasping. The outer peripheral surface of cap 17 on body 22 is also knurled to assure that a good manual grasp of the body 22 is achievable.

It will be noted from FIG. 1 that flange 46 acts as a positioning member for conduit 38 when such conduit is inserted in a receptacle. That is, the flange engages the structure defining the receptacle filler opening 16 and seats the valve and, hence, the container 13, thereon. The length of the conduit 38 between the flange 46 and its free end defines the distance between the receptacle filler opening and the liquid level to which the receptacle is filled.

Figure 2:
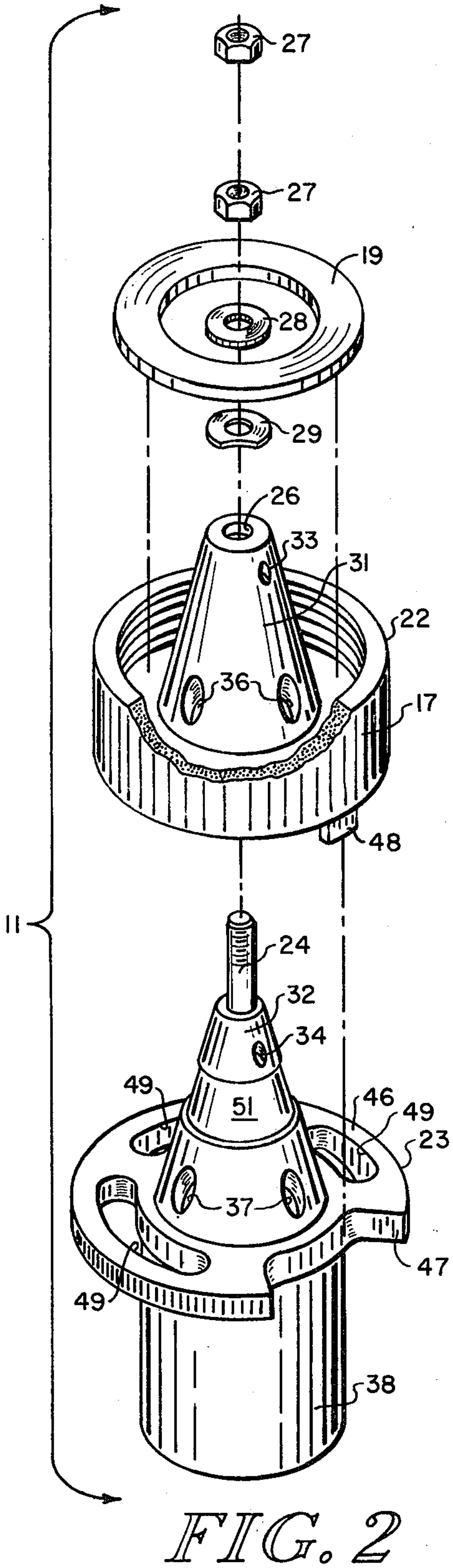
FIG. 2 is an exploded, isometric view of the valve preferred embodiment illustrated in FIG. 1.

Cooperable stop means are provided on bodies 22 and 23 which limit their relative rotation to between the liquid pouring position shown in FIG. 1 in which the air and liquid ports of the two bodies are in communication with one another and a closed position in which such ports are misaligned. More particularly, as best seen in FIG. 2, the flange 46 includes a relieved section 47 within which a tab 48 depending from body 22 rides. When tab 48 is in engagement with the lefthand edge of relieved section 47, as viewed in the drawing, the ports are in registration with one another. However, when the tab 48 is in engagement with the righthand edge of such relieved section, the ports are completely misaligned to break their communication. Flange 46 includes annular grooves 49 in addition to the relieved section 47. Grooves 49 are provided merely to save constructional material.

The mating surfaces of the conical projections 31 and 32 define both bearing and sealing surfaces facilitating relative rotation of the bodies and preventing leakage between the ports when such ports are misaligned. In this connection, projection 32 includes an annular relieved section 51 between the air and liquid ports. This relieved section not only reduces the amount of material required to form body 23, it also reduces the likelihood of any surface imperfections interfering with a tight mating relationship between the conical parts.

It should be noted that because the mating surfaces of the two bodies are conically shaped, a relatively good fit between the two can be assured to make leakage through the valve unlikely when the ports are misaligned. In this connection, the provision of the spring washer 29 tends to urge the mating surfaces of the two bodies into tight contact while yet permitting relative rotation therebetween without much difficulty.

While the bodies 22 and 23 of dispensing valve 11 can be made of many different materials, they are preferably molded from a plastic. A high density polyethylene is especially desirable in view of its resistance to attack by many different liquids.

The invention has been described in connection with a preferred embodiment to satisfy the requirements of the patent statutes. It will be recognized by those skilled in the art, though, that various changes and modifications can be made without departing from the concepts embodied in the valve described. It is therefore intended that the coverage afforded applicant be limited only by the claims and their equivalent language.

I claim:

1. An automatic shutoff liquid dispensing valve for controlling the flow of liquid from a container into a receptacle comprising:

A. a cap portion to be secured hermetically on the mouth of a liquid container from which liquid is to be dispensed;

B. a stud portion projecting axially from said cap portion to be positioned interiorly of said container when said cap portion is secured on its mouth;

C. at least two passages extending through said stud portion;

(1) one of said passages being a liquid passage for the flow of liquid from said container and the other of said passages being an air passage for the flow of air into said container to permit liquid to flow therefrom;

(2) said passages communicating the interior of said container with a common passageway extending through said cap portion and through which air and liquid flow in opposite directions to audibly interact with one another when liquid is being dispensed from said container; and (3) said air passage communicating with said common passageway further from said cap portion than said liquid passage whereby air in said common passageway enters said air passage without interference by liquid flowing into said common passageway from said liquid passage; and D. a conduit portion hermetically communicating with said common passageway and projecting outwardly from said cap portion to have its free end immersed by liquid within said receptacle upon liquid being at a predetermined depth therewithin, said free end of said conduit having an inlet for air into the same and thereby into said common passageway whereby upon said free end of said conduit being immersed by liquid, flow of air through said air inlet is terminated with consequent termination of flow of liquid from said container.

2. An automatic shutoff liquid dispensing valve according to claim 1 wherein there are a plurality of said liquid passages communicating the interior of said container with said common passageway whereby an increased volume of liquid can flow through said valve into said receptacle.

3. An automatic shutoff liquid dispensing valve according to claim 2 wherein said conduit portion is an extension of said common passageway whereby when its free end is immersed by liquid within said receptacle flow of air into said common passage is completely blocked to terminate all flow of liquid from said container.

4. An automatic shutoff liquid dispensing valve according to claim 1 further including means actuatable manually to prevent liquid flow through said valve.

5. An automatic shutoff liquid dispensing valve according to claim 4 wherein said valve comprises two coaxial mating bodies defining said stud portion, the inner one of such bodies providing said common passageway and having a pair of ports extending therethrough for respective registration with associated ports in the other one of said bodies to provide said air and liquid passages extending through said stud portion, and said manually actuatable means to prevent liquid flow through said valve includes means graspable manually to rotate one of said bodies relative to the other to misalign the ports of one relative to the ports of the other.

6. An automatic shutoff liquid dispensing valve according to claim 5 further including cooperable stop means on said two bodies limiting relative rotation of the same to between a liquid pouring position in which both the air and liquid ports of each are in communication with such ports of the other to define said air and liquid passages and a closed position in which said ports are misaligned to break said communication.

7. An automatic shutoff liquid dispensing valve according to claim 5 wherein the mating surfaces of said inner and outer bodies define both bearing and sealing surfaces to facilitate said relative rotation and to prevent leakage between said ports and, hence, leakage through said passages when said ports are misaligned.

8. An automatic shutoff liquid dispensing valve according to claim 7 wherein said mating surfaces of said two bodies are conically shaped and taper inwardly in a direction away from said cap portion.

9. An automatic shutoff liquid dispensing valve according to claim 8 wherein there are a plurality of said liquid passages communicating the interior of said container with said common passageway whereby an increased volume of liquid can flow through said valve into said receptacle, and further including cooperable stop means on said two bodies limiting relative rotation of the same to between a liquid pouring position in which the air and liquid ports of each are in communication with such ports of the other to define said air and liquid passages and a closed position in which said ports are misaligned to break said communication.

10. An automatic shutoff liquid dispensing valve according to claim 9 wherein said conduit portion is an extension of said common passageway whereby when its free end is immersed by liquid within said receptacle flow of air into said common passage is completely blocked to terminate all flow of liquid from said container.

* * * * *